(No Model.)

A. REED.
NUT LOCK.

No. 410,445. Patented Sept. 3, 1889.

WITNESSES:
Fred G. Dieterich
Edw. W. Byrn.

INVENTOR
Andrew Reed
BY
Munn & Co.
ATTORNEY

UNITED STATES PATENT OFFICE.

ANDREW REED, OF LAWRENCE, KANSAS.

NUT-LOCK.

SPECIFICATION forming part of Letters Patent No. 410,445, dated September 3, 1889.

Application filed December 10, 1888. Serial No. 293,071. (No model.)

*To all whom it may concern:*

Be it known that I, ANDREW REED, of Lawrence, in the county of Douglas and State of Kansas, have invented a new and useful Improvement in Nut-Locks, of which the following is a specification.

My invention relates to that class of nut-locks in which the threaded end of the bolt is formed with reduced and flattened sides, and the nut is held on the bolt against turning by a separate locking-plate which embraces the flattened end of the bolt, and extends down beside one of the faces of the nut; and my improvement consists in the peculiar construction and arrangement of this locking device, which I will now proceed to describe.

Figure 1:
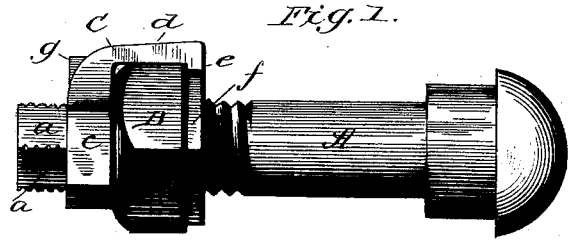
Figure 2:
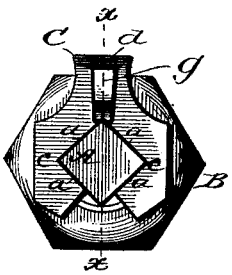
Figure 3:
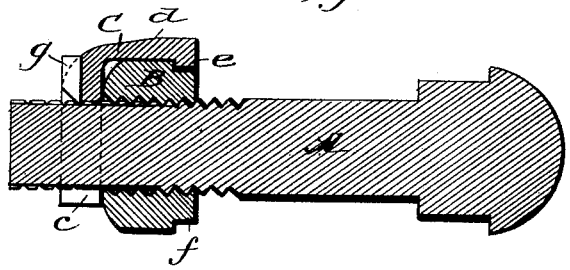

Figure 1 is a side view of a bolt and nut provided with my invention. Fig. 2 is an end view, and Fig. 3 is a longitudinal section through line $x$ $x$.

A is the bolt, whose end is screw-threaded in the usual way and provided with a nut B. The outer end of the screw-threaded portion of the bolt is reduced to form flat angular sides $a$, which, as shown, present a square cross-section.

C is a wrench-shaped locking device formed with two jaws $c$ $c$, which embrace and closely fit the three angles of the square end of the bolt and leave the fourth angle uninclosed. This wrench-shaped locking device has a shank portion $d$, which is bent at right angles to its jaws and extends down beside one of the faces of the nut and terminates with an inwardly-projecting lip or flange $e$, adapted to drop into a recess $f$, formed on the rear or inner edge of the nut.

Between the two jaws of the locking device is formed an undercut groove, in which slides a wedge-shaped tooth or dog $g$, whose chisel-shaped inner end is adapted to be forced into engagement with one of the notches $b$, formed on the angles of the squared portion of the bolt.

The operation of this nut-lock is as follows: The nut is first turned up to its place on the bolt. The wrench-shaped locking-bar is then applied with its jaws to the squared end of the bolt and slipped up to a bearing against the nut, and, as one side of the squared end of the bolt is not embraced by the jaws, sufficient looseness for the locking-bar in slipping on is allowed to permit the flange or lip $e$ on the shank of the bar to pass alongside one of the faces of the nut until it drops into the recess at the rear or inner edge of the nut. The tooth or dog $g$ is then driven up until its chisel-shaped end engages one of the notches $b$ in the bolt, and this tightens the wrench-shaped locking-bar on the bolt and also locks the lip $e$ in the recess of the nut. In this position of parts the wrench-shaped locking-bar is prevented from slipping off both by the lip $e$ in recess $f$ of the nut and by the tooth or dog $g$ in the notches $b$ of the bolt. The squared end of the bolt keeps the wrench-shaped bar from turning, and the latter by lying flat against one of the faces of the nut prevents it from rotating, thus securely locking the nut on the bolt.

Having thus described my invention, what I claim as new is—

1. The combination, with the screw-threaded bolt having angularly-reduced end and a nut, of a wrench-shaped locking-bar C, consisting of two jaws $c$ $c$, with right-angular shank $d$, the said jaws being adapted to embrace the angular end of the bolt and provided with a locking tooth or dog $g$, as and for the purpose described.

2. The combination, with the screw-threaded bolt A, having angularly-reduced end $a$, and a nut B, with recess $f$, of the wrench-shaped locking-bar C, having jaws $c$ $c$, with tooth or dog $g$, and the right-angular shank $d$, with flange or lip $e$, substantially as shown and described.

ANDREW REED.

Witnesses:
CHARLES C. YATES,
WILLIS M. HUGHES.